H. KENNELL.
BOTTLE HOLDER.
APPLICATION FILED APR. 11, 1916.
1,227,451.
Patented May 22, 1917.
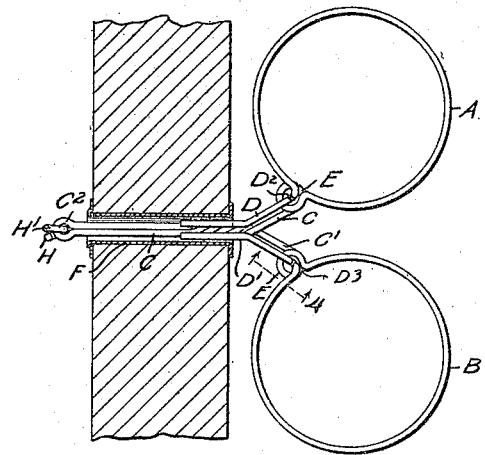
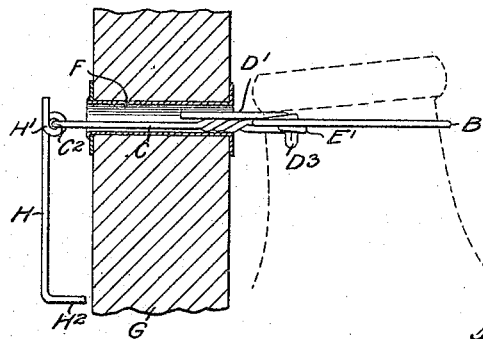
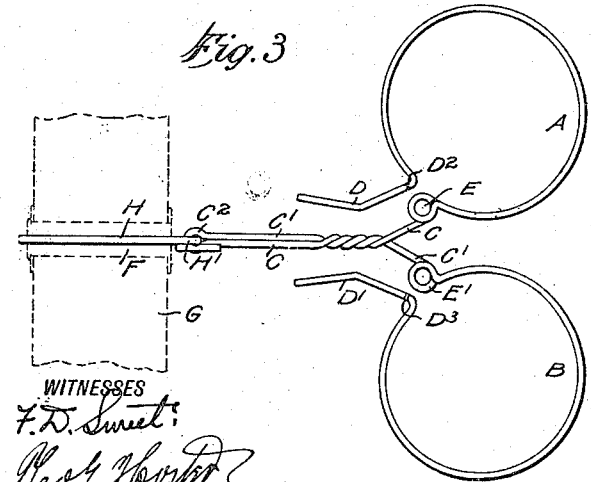
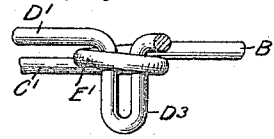
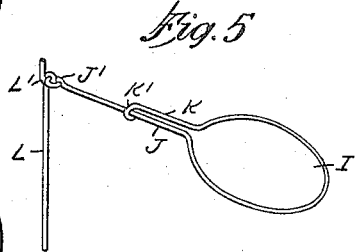
WITNESSES
INVENTOR
Henry Kennell
BY
ATTORNEYS

UNITED STATES PATENT OFFICE.

HENRY KENNELL, OF NEW YORK, N. Y.

BOTTLE-HOLDER.

1,227,451.  Specification of Letters Patent.  Patented May 22, 1917.

Application filed April 11, 1916. Serial No. 90,383.

*To all whom it may concern:*

Be it known that I, HENRY KENNELL, a citizen of the United States, and a resident of the city of New York, borough of Manhattan, in the county and State of New York, have invented a new and Improved Bottle-Holder, of which the following is a full, clear, and exact description.

The object of the invention is to provide a new and improved bottle holder more especially designed for use on doors and which is very simple in construction, cheap to manufacture, easily applied and arranged to enable the milkman to readily place one or more bottles of milk in position on the holder, to close and lock the same to prevent unauthorized persons from abstracting the bottle, and to allow the tenant of the house on opening the door to readily remove the bottle or bottles from the holder.

In order to accomplish the desired result, use is made of an open loop adapted to receive the neck of a bottle, a shank extending from one end of the loop, a closing arm extending from the other end of the loop and a retaining arm pivoted on the end of the said shank, the latter being adapted to pass through a hole in the door, and the said closing arm being adapted to pass into and out of the hole, the said retaining arm when in one position being in alinement with the shank and in another position being at an angle to the shank and adapted to abut against the inner face of the door.

A practical embodiment of the invention is represented in the accompanying drawings forming a part of this specification, in which similar characters of reference indicate corresponding parts in all the views.

Figure 1 is a plan view of the bottle holder in double form for holding two bottles, the holder being in closed position on a door, the latter being shown in section;

Fig. 2 is a side elevation of the same with the door in section;

Fig. 3 is a plan view of the double holder in open position;

Fig. 4 is an enlarged sectional side elevation of part of the holder on the line 4—4 of Fig. 1; and Fig. 5 is a perspective view of a bottle holder in single form for holding a single bottle.

The improved bottle holder is preferably made of spring wire and may be in the form for holding two bottles of milk at a time, as shown in Figs. 1, 2 and 3, or in the form for holding but a single bottle of milk as illustrated in Fig. 5. The double holder shown in Figs. 1, 2, 3 and 4, consists of two open loops A and B each adapted to be engaged by the neck of a bottle, and the said loops A and B terminate at one end in shanks C, C' twisted together and terminating in an eye $C^2$. The other ends of the loops A and B terminate in closing arms D, D' for conveniently opening and closing the loops when inserting or removing bottles. Each of the shanks C, C' is bent adjacent to its loop A or B into a coil E or E', into the opening of which is adapted to pass an offset $D^2$ or $D^3$ formed on the corresponding arm D or D' adjacent the loop A or B. Thus when the offsets $D^2$, $D^3$ engage the coils E, E' the loops A and B are closed so as to prevent removal of a bottle from the corresponding loop. The twisted or doubled-up shanks C, C' are adapted to be passed through a short tube F held in the door G and extending from the outer face to the inner face thereof, and the eye $C^2$ is engaged by a coil H' formed on a retaining arm H, made of wire, with the coil $C^2$ near one end thereof. The other end of the arm H is provided with an angular member $H^2$. When the shanks C, C' are pushed rearwardly through the tube F the arm H hangs downward by its own weight thus abutting against the inner face of the door G to allow forward movement of the shanks, their loops and the bottles supported thereby, with the terminals of the arms D, D' extending within the tube F. Now when the tenant of the house desires to obtain possession of the bottles it is necessary for the tenant to open the door and to swing the arm H into horizontal position, that is, into alinement with the shanks C, C' to allow of pulling the shanks forward until the arms D, D' are disengaged from the tube F and the angular terminal $H^2$ of the member H abuts against the inner end of the tube F (see Fig. 3). The tenants can now disengage the offsets $D^2$, $D^3$ from the coils E, E' to allow of opening the loops A and B with a view to remove the bottles therefrom. After this has been done, the tenant allows the shanks C, C' and their loops A and B to swing downward supported from the arm H. The milkman at the next delivery swings the loops into horizontal position and then the milkman places the bottles into the open loops A and B, closes the same by engaging the offsets D², D³ with the coils E, E', and then pushes the shanks C, C' and the retaining member H rearwardly to engage the shanks and the arms D, D' with the tube F and to allow the member H to swing downward into vertical position after the eye C² has passed through the rear end of the tube F.

In the single form shown in Fig. 5 the open loop I terminates at one end in a shank J and at the other end in an arm K having a hook K' adapted to engage the shank J to close the loop I after the bottle is inserted therein. The shank J terminates in an eye J' engaged by a coil L' arranged near one end of a retaining member L similar to the member H but without the angular offset H². In this case the member L is swung into horizontal position, that is, into alinement with the shank J to permit of drawing the device out of engagement with the tube F, and then the tenant can conveniently unhook the hook K' from the shank J to allow of removing the bottle from the loop. The milkman on the next delivery engages the open loop I with the neck of the bottle and then closes the loop and engages the hook K' with the shank J, after which the retaining member L with the shank J is pushed through the tube F so that the arm K passes into the tube F and the member L swings into angular position by its own gravity thus abutting against the rear face of the door G. As long as the member K is in vertical position it is impossible for an unauthorized person to draw the loop and with it the bottle supported thereby forwardly at the same time preventing said unauthorized person from disconnecting the hook K' from the shank J or disengaging the arm K from the tube F. It is understood that the tube F simply provides a hole through the door for the purpose specified.

Having thus described my invention, I claim as new and desire to secure by Letters Patent:

1. A bottle holder, comprising two normally open loops each adapted to engage the neck of a bottle, one end of each loop terminating in a shank and the shanks of the two loops being twisted together and terminating in an eye, the other end of each loop terminating in a closing arm, the said shanks being adapted to pass through a hole in a door and the said closing arms being adapted to pass into the hole, and a retaining member having an eye near one end and engaging the eye on the said shank.

2. A bottle holder, comprising two normally open loops each adapted to engage the neck of a bottle, one end of each loop terminating in a shank and the shanks of the two loops being twisted together and terminating in an eye, the other end of each loop terminating in a closing arm, the said shanks being adapted to pass through a hole in a door and the said closing arms being adapted to pass into the hole, each of the said shanks being provided adjacent the loop with a coil and each of the said closing arms being provided adjacent the coil with an offset adapted to engage the corresponding coil to hold each loop locked when in closed position, and a retaining member having an eye near one end and engaging the eye on the said shank.

3. A bottle holder comprising an open loop adapted to engage the neck of a bottle, one end of the loop terminating in a shank and the other in a closing arm the said shank being adapted to extend through a hole in a support and the said closing arm being adapted to pass into the hole, means for holding the loop in closed position, and a retaining and unlocking member pivotally connected to the terminal of the shank near one end of the said retaining and locking member, the other end of the said retaining and locking member having an angular offset spaced from the pivotal connection a distance corresponding approximately to the length of the hole in the support, the said retaining and unlocking member in one position extending vertically at an angle to the shank at the inner face of the support and the said retaining and unlocking member in another position being in alinement with the shank and with the said angular offset abutting against the inner face of the support to hold the device against removal from the support and to allow of opening the loop for the removal or insertion of a bottle.

In testimony whereof I have signed my name to this specification in the presence of two subscribing witnesses.

HENRY KENNELL.

Witnesses:
    THEO. G. HOSTER,
    PHILIP D. ROLLHAUS.